US009633251B2

(12) United States Patent
Yi et al.

(10) Patent No.: US 9,633,251 B2
(45) Date of Patent: Apr. 25, 2017

(54) FACIAL IDENTIFICATION METHOD, FACIAL IDENTIFICATION APPARATUS AND COMPUTER PROGRAM FOR EXECUTING THE METHOD

(71) Applicant: University of Seoul Industry Cooperation Foundation, Seoul (KR)

(72) Inventors: Youngmin Yi, Seoul (KR); Saehanseul Yi, Gyeonggi-do (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 14/877,938

(22) Filed: Oct. 8, 2015

(65) Prior Publication Data

US 2016/0110590 A1    Apr. 21, 2016

(30) Foreign Application Priority Data

Oct. 15, 2014 (KR) ........................ 10-2014-0139096

(51) Int. Cl.
*G06K 9/48* (2006.01)
*G06K 9/00* (2006.01)
*G06K 9/62* (2006.01)
*G06K 9/46* (2006.01)

(52) U.S. Cl.
CPC ..... *G06K 9/00288* (2013.01); *G06K 9/00228* (2013.01); *G06K 9/00268* (2013.01); *G06K 9/00973* (2013.01); *G06K 9/00986* (2013.01); *G06K 9/6215* (2013.01); *G06K 9/6257* (2013.01); *G06K 2009/4666* (2013.01)

(58) Field of Classification Search
CPC ........... G06K 9/00288; G06K 9/00281; G06K 9/6215; G06K 9/6257
USPC ....................................................... 382/118
See application file for complete search history.

(56) References Cited

PUBLICATIONS

Jun et al: "Local Transform Features and Hybridization for Accurate Face and Human Detection", IEEE, 2013.*
Dwith et al: Parallel Implementation of LBP Based Face Recognition on GPU Using OpenCL, IEEE, 2012.*
Jeong-Sub Lee, et al., "Face Authentication using Multi-radius LBP Matching of Individual Major Blocks in Mobile Environment", Jul. 2013, pp. 515-523, JBE vol. 18, No. 4.
Bharatkumar Sharma, et al., "Towards a Robust, Real-time Face Processing System using CUDA-enabled GPUs", High Performance Computing (HIPC), 2009 International Conference on, Dec. 2009, pp. 368-377.
Paul Viola et al., "Rapid Object Detection using a Boosted Cascade of Simple Features", Computer Vision and Pattern Recognition (CVPR), 2001, pp. I-511-I518.
Timo Ahonen et al., "Face Description with Local Binary Patterns: . . . ", IEEE Transactions on Pattern Analysis and Machine Intelligence, vol. 28, No. 12, Dec. 2006.

* cited by examiner

*Primary Examiner* — Ruiping Li
(74) *Attorney, Agent, or Firm* — Revolution IP, PLLC

(57) ABSTRACT

A facial identification method includes changing an image size for facial identification, converting the image of changed size to an LBP domain, and detecting a face through scanning across the converted image. At least one or more of steps of converting and scanning is executed by a plurality of processing units.

15 Claims, 8 Drawing Sheets

FACIAL IDENTIFICATION METHOD, FACIAL IDENTIFICATION APPARATUS AND COMPUTER PROGRAM FOR EXECUTING THE METHOD

CROSS-REFERENCE TO RELATED APPLICATION(S)

This application is based on and claims priority to Korean Patent Application No. 2014-0139096, filed on Oct. 15, 2014, the disclosure of which is incorporated herein in its entirety by reference.

TECHNICAL FIELD

The present invention relates to a facial identification method, a facial identification apparatus and a computer program for executing the method, and, more particularly, to a facial identification method, a facial identification apparatus and a computer program for executing the method to implement facial detection and facial recognition in real time by parallelizing facial identification algorithms in consideration of a plurality of processing cores.

BACKGROUND

Face detection is a first stage in applications for finding a face in given image frames and handling facial images. On the other hand, face recognition is a process of comparing a given test image or detected face image with faces stored in a DB (database) to find a specific face or person from the DB.

Recently, face detection and face recognition have been used in various fields. For example, face detection and face recognition are used for biometrics and security to access buildings and doors, intellectual security, customized provision of products in consideration of potential customer's age, and anti-sleep applications to cars.

At present in relation to security in CCTV cameras, it is necessary to apply face detection or face recognition technology, but images are manually monitored from CCTV cameras in different places or locations. Automatically detecting and recognizing faces in a security system by using CCTV cameras and enabling tracking after the face recognition would provide quite a few benefits.

Meanwhile, face detection and face recognition may also be used for identifying users for mobile phones, smart phones, tablet PCs, and laptop computers.

Since typical face detection and face recognition techniques involve huge data to be processed and a huge amount of operations, this is a difficulty in real-time processing. Therefore, they are not fully applicable to various fields (especially, security).

Furthermore, the resolution of input images used in face detection is getting higher day by day (for example, from SD (Standard Definition) to HD (High Definition)), and real-time processing requires more computer power. In addition, as the number of images in a DB used in face recognition increases, the face recognition process takes more time.

Meanwhile, for maximizing graphic processing, general-purpose GPUs (Graphics Processing Units) are widely used. If applications have high parallelism, the GPUs may perform the applications more rapidly than general CPUs. Such a graphic processing unit has been generally designed and used for servers or personal computers.

Because of the needs for maximized performance of portable terminals such as smart phones or tablet PCs, appearance of and needs for various parallel processing applications, embedded GPUs are thus mass-produced now and applied to portable terminals. The aforementioned embedded GPU may be generally packaged into a single chipset together with an AP (Application Processor) to process various parallel processing applications in portable terminals. The embedded GPU may be, for example, Tegra K1, Adreno, Mali or PowerVR. The embedded GPU supports the OpenCL framework or the CUDA framework that may support applications of various fields executable on an embedded GPU, and includes a plurality of microprocessing units. For example, 192 microprocessing units may be included in an embedded GPU, and execute threads that are program's processing unit. Microprocessing units may be clustered, and a macroprocessing unit consists of the clustered microprocessing units. The embedded GPU may also include a plurality of macroprocessing units. The macroprocessing units and the microprocessing units may be named differently depending on each GPU type.

Using a GPU may reduce CPU or AP processing loads, and specialized parallel processing capability thereof may improve processing performance. However, if an application is configured for sequential processing, using a GPU worsens processing performance because of sending/receiving data to/from a CPU or AP and managing memories.

Processing methods used for face detection and recognition include a processing method based on Haar features and a processing method based on LBP (Local Binary Pattern) features. Since a facial identification method based on the LBP features is more efficient than a method based on the Haar features in terms of LBP feature differentiation and calculation, a current tendency is that processing methods based on Haar features are replaced by the processing method based on LBP features.

The facial identification method based on LBP features is an algorithm based on an assumption of sequential processing, and it is thus necessary to apply various optimization technologies to apply the method to a GPU to improve performance resulting from application to the GPU.

As such, there is a need for a facial identification method, a facial identification apparatus and a computer program for executing the method in order to improve processing performance based on LBP features used for facial identification on an apparatus or a chipset with a plurality of processing units.

SUMMARY

In view of the above, the present invention provides a facial identification method, a facial identification apparatus, and a computer program for executing the method, for facial identification by using a plurality of processing units executable in parallel.

Further, the present invention provides a facial identification method, a facial identification apparatus and a computer program for executing the method, for real-time face detection and face recognition by using an embedded GPU.

Further, the present invention provides a facial identification method, a facial identification apparatus and a computer program for executing the method for real-time face detection and face recognition from input images of high resolution by analyzing a processing method based on LBP features and changing the method optimized to an embedded GPU.

Technical subjects of the present invention are not limited to the aforementioned technical subjects, and other technical subjects not described above will be apparent to those skilled in the art of the present invention from the following description.

In accordance with a first aspect of the present invention, there is provided a method for identifying a face, the method including: (a) changing an image size for facial identification; (b) converting the image of changed size to an LBP (Local Binary Pattern) domain; and (c) detecting a face through scanning across the converted image, wherein at least one or more of said steps (b) and (c) is executed by a plurality of processing units.

In accordance with a second aspect of the present invention, there is provided a facial identification apparatus, the apparatus including: a processor configured to load a facial identification program to be executed; and a GPU (Graphics Processing Unit) connected to the processor and comprising a plurality of processing units, wherein the facial identification program is configured to: change an image size for facial identification; convert the image of changed size to an LBP domain; and detect a face through scanning across the converted image and wherein a plurality of processing units of the GPU execute one or more of functions of the converting to the LBP domain and the face detection through scanning in cooperation with the processor.

In accordance with a third aspect of the present invention, there is provided a computer program stored in a medium, which is combined with hardware to carry out each step of the facial identification method, wherein the method includes: (a) changing an image size for facial identification; (b) converting the image of changed size to an LBP (Local Binary Pattern) domain; and (c) detecting a face through scanning across the converted image, wherein at least one or more of said steps (b) and (c) is executed by a plurality of processing units.

In accordance with the aspects of the present invention, the aforementioned facial identification method, the facial identification apparatus and the computer program for executing the method enable facial identification by using a plurality of processing units executable in parallel.

In addition, the aforementioned facial identification method, the facial identification apparatus and the computer program for executing the method enable implementing real-time face detection and face recognition by using an embedded GPU.

In addition, the aforementioned facial identification method, the facial identification apparatus and the computer program for executing the method enable real-time face detection and face recognition from input images of high resolution by analyzing a method based on LBP features and changing the method to be optimized to an embedded GPU.

The effect of the present invention is not limited to those described above, and other effects not described above will be apparent to those skilled in the art of the present invention from the following description.

DETAILED DESCRIPTION

The aforementioned objects, characteristics and advantages of the present invention will be apparent from the following description provided in detail with reference to the accompanying drawings, to help those skilled in the art understand the technical scope of the present invention. In addition, if a specific description of technology well known in the art in relation to the present invention is considered to make the gist of the present invention unnecessarily unclear while describing the present invention, the specific description is not provided. The embodiments in accordance with the present invention will be described in detail hereinafter with reference to the accompanying drawings.

Figure 1:
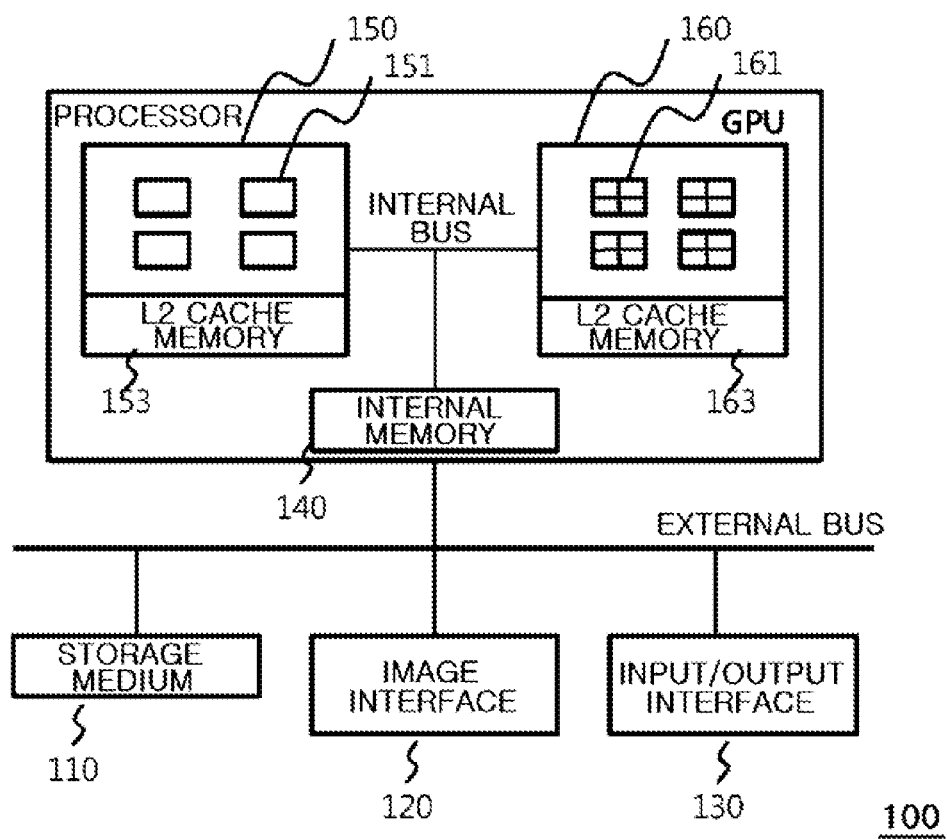
FIG. 1 is an exemplary hardware block diagram of a facial identification apparatus.

FIG. 1 is an exemplary hardware block diagram of a facial identification apparatus 100.

Referring to FIG. 1, the facial identification apparatus 100 includes a processor 150, a GPU (Graphics Processing Unit) 160, an internal memory 140, a storage medium 110, an image interface 120 and an input/output interface 130. Some of the aforementioned components may not be included or other components may be further added depending on design change or the use of the facial identification apparatus 100. For example, in case where the facial identification apparatus 100 is a smart phone, the facial identification apparatus 100 may further include a communication interface connected to a short-range network or a mobile communication network.

As used herein, the term 'facial identification' includes or represents at least face detection and/or face recognition. Therefore, 'facial identification' represents herein at least face detection or face recognition, or represents both of them.

The facial identification apparatus 100 may be, for example, a mobile phone, smart phone, tablet PC, laptop computer, CCTV camera or set top box connected to a CCTV camera, or an access controller for controlling user's access to entrance doors. Preferably, the processor 150, the GPU 160 and the internal memory 140 included in the facial identification apparatus 100 make one chipset. The chipset may be a chipset called, for example, an AP (Application Processor). The processor 150 and the GPU 160 in the chipset may send/receive data each other through an internal bus (for example, ARM bus) and share data by using the internal memory 140.

More specifically for each component, the storage medium 110 is composed of any one or more of a volatile memory, a non-volatile memory and a hard disk. The storage medium 110 stores programs or temporarily stores data accessed by the programs. The storage medium 110 stores the facial identification program for executing the method for facial identification, and data used by the facial identification program and for face detection and face recognition in accordance with the present invention. The stored data include data used for face detection, and those used for face recognition. In addition, the storage medium 110 may further include a test image, or a video image including one or more test images for facial identification.

The image interface 120 receives video signals. The image interface 120 receives, for example, analog or digital video signals. The image (data) of the video signals may be stored in the storage medium 110 under the control of the processor 150. The image interface 120 includes a camera sensor, for example, a CCD (Charge Coupled Device) or a CMOS (Complementary Metal-Oxide Semiconductor) to capture the image of video signals for each frame. The captured image for each frame is stored in the storage medium 110 by the control of processor 150 as a video image or a single image.

The input/output interface 130 is used for receiving input by a user of the facial identification apparatus 100 and outputting data for the user. The input/output interface 130 has a touch panel, buttons and a microphone to receive input by the user and send received user's input to the processor 150. One of user's inputs may be, for example, an input for requesting driving or starting the facial identification program. Further, the input/output interface 130 may have a loudspeaker and a display to output data for the user. For example, the input/output interface 130 may display a detected face image on a test image or track the detected face image for each image frame, and display the face image detected in the tracking process.

The internal memory 140 is a memory accessible by both the processor 150 and the GPU 160. Preferably, since the internal memory 140 is embedded in a chipset, the processor 150 or the GPU 160 may access the internal memory 140 more rapidly than the storage medium 110. The internal memory 140 may be, for example, a volatile memory or further include a non-volatile memory.

The processor 150 controls each component in the facial identification apparatus 100. Preferably, the processor 150 controls other components by using programs stored in the storage medium 110 or the internal memory 140. The processor 150 may automatically load programs onto the internal memory 140 or a specific memory of the storage medium 110. In other cases, the processor 150 may load a specific program onto the internal memory 140 by using user's input through the input/output interface 130.

The processor 150 is configured to load the facial identification program stored, at least, in the storage medium 110, onto the internal memory 140 and execute the facial identification program. The processor 150 may be embedded with a plurality of processing units 151 and an L2 cache memory 153. The L2 cache memory 153 is constructed to store any data of the internal memory 140 or the storage medium 110 in the unit of cache line sizes, and one or more processing units 151 are configured to execute programs stored in the storage medium 110.

The processor 150 may load the facial identification program onto the internal memory 140 and the L2 cache memory 153 to access the image interface 120 and the input/output interface 130, drive and control the GPU 160 in compliance with commands by the facial identification program.

The GPU 160 is connected to the processor 150 through an internal bus. The GPU 160 is configured to reduce the load on the processor 150, and provides a high level of parallelism. Further, the GPU 160 may execute application programs based on the CUDA or the OpenCL in cooperation with the processor 150 under the control of the processor 150. For example, the GPU 160 may be a known *Mali* GPU or a Tegra K1 GPU. The aforementioned GPU 160 may also be embedded as a single chipset together with the processor 150, and named an embedded GPU.

The GPU 160 is embedded with a plurality of processing units 161 and a L2 cache memory 163 therein. The plurality of processing units 161 may execute program code blocks (for example, threads, thread blocks (groups)) independently or in parallel. Each processing unit 161 may further include smaller-sized microprocessing units therein. The L2 cache memory 163 may store any data of the internal memory 140 or the storage medium 110 in the unit of cache line sizes, and be accessed by the processing units 161.

The processing unit 161 or the microprocessing unit of the GPU 160 is configured to process, preferably, SIMD (Single Instruction Multiple Data) commands, and, in addition, to include a vector engine. If the processing unit 161 includes microprocessing units, the processing unit 161 may execute a thread group, so called, WARP, and the microprocessing unit may execute threads. The processing unit 161 may not include microprocessing units, and the internal architecture of the GPU 160 may be different depending on the type of the GPU 160 (for example, Mali GPU, Tegra K1 GPU).

The GPU 160 or the processing unit 161 in the GPU 160 may execute a program code (thread group or thread) for executing at least all or some functions of the facial identification program in parallel.

The method of execution in the GPU 160 for facial identification is described hereinbelow in detail.

Figure 2:
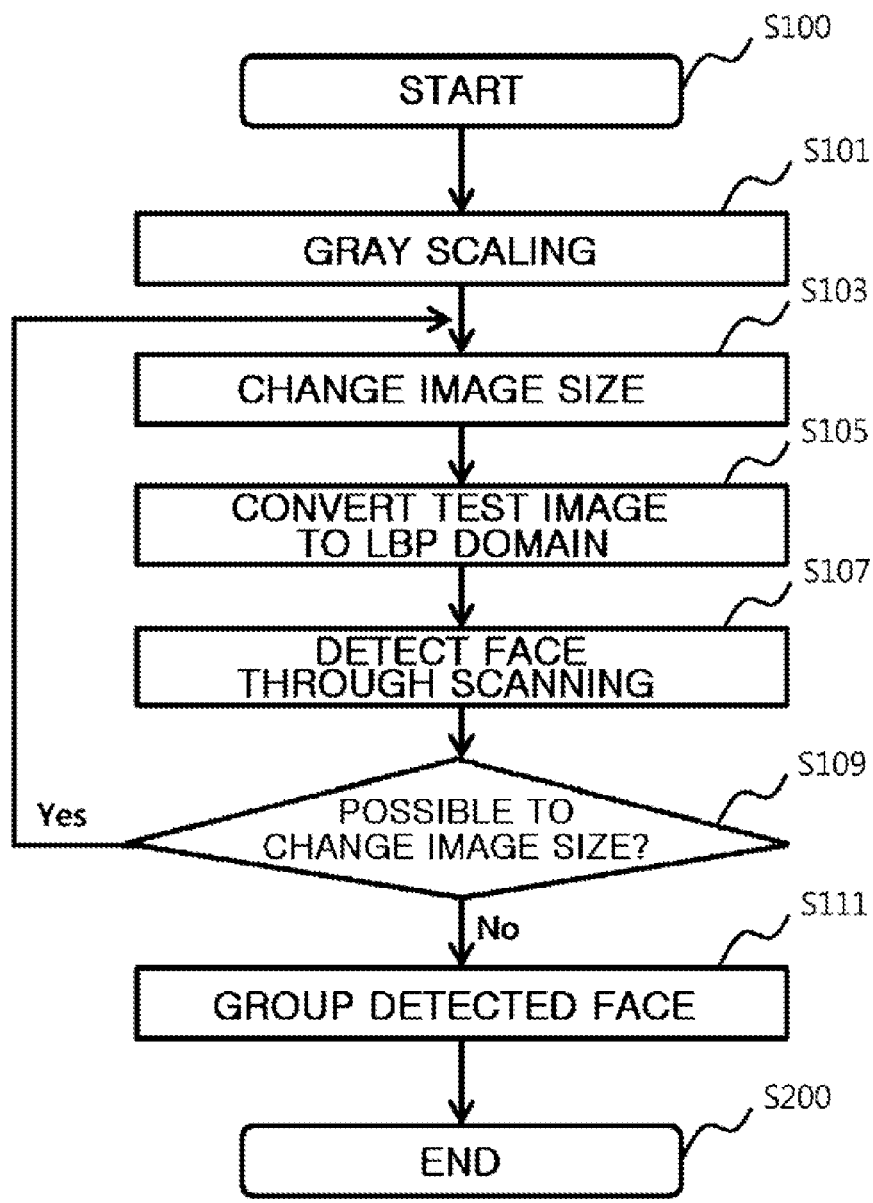
FIG. 2 is an exemplary flow diagram for face detection.

FIG. 2 is an exemplary flow diagram for face detection.

The flow diagram shown in FIG. 2 is carried out in the facial identification apparatus 100. Preferably, the flow diagram shown in FIG. 2 is constructed to load the facial identification program by the processor 150, allocate specific functions of the facial identification program to the processing units 161 of the GPU 160 in cooperation with the processor 150 to execute them in parallel. Each function is allocated to the processing units 161 of the GPU 160 by the processor 150, and, preferably, by the facial identification program. Although the flow diagram shown in FIG. 2 is an example carried out for one test image, the flow diagram may repeat even for a video constructed with a plurality of test image frames. Preferably and in addition, a flow progresses for face recognition immediately after the flow shown in FIG. 2.

Preferably, transition between steps(operations) in the flow diagram shown in FIG. 2 may be carried out by the processor 150, and each step may be carried out by the processor 150 or the GPU 160. The part for parallel operation may be carried out by the processing units 151 of the processor 150 or the processing units 161 of the GPU 160 in parallel. Preferably, specific steps (for example, S103, S105, and S107) may be carried out by the processing units 161 of the GPU 160. Unless otherwise mentioned hereinbelow, a specific step is carried out by the processor 150 or the GPU 160. The following description is based on the case that a specific function is carried out by the processing unit 161 of the GPU 160.

First, the flow diagram starts at step S100 by loading the facial identification program by the processor 150, and loading a test image, the target image for face detection, from storage medium 110 or image interface 120 onto the internal memory 140.

The facial identification apparatus 100 gray-scales the colored test image as an achromatic image at step S101.

Subsequently, the facial identification apparatus 100 changes the size of the gray-scaled test image to comply with a scaling factor at step S103 (see FIG. 5A). Changing the size of the gray-scaled test image at step S103 after step S101 may be omitted. The scaling factor is specified as a specific real number (for example, 1.2, etc.), and the test image size is reduced to comply with the scaling factor, and at least steps S103 to S107 are repeated. In general, since it is unknown how big the face is shown on the test image, face detection is required for a test image in various sizes.

Subsequently, the facial identification apparatus 100 converts the test image of scaled and changed size onto an LBP (Local Binary Pattern) domain at step S105. As a result of the conversion, the facial identification apparatus 100 may obtain the test image converted to the LBP domain.

Figure 3:
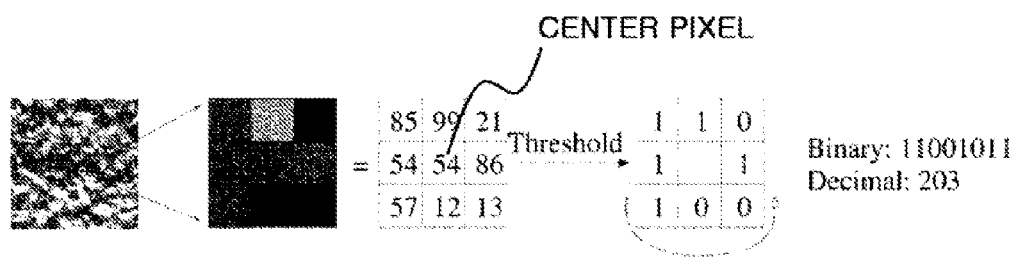
FIG. 3 is an exemplary operation for image conversion to an LBP(Local Binary Pattern) domain.

FIG. 3 is an exemplary operation for image conversion to an LBP domain. The example of FIG. 3 is for calculating LBP features for a center pixel 54 which is a target pixel of the test image to be converted to the LBP domain. This exemplary conversion is carried out for all pixels in the test image. Since conversion of each pixel to be converted to the LBP domain may be carried out independently of other pixels, it is carried out by, preferably, each of the processing units 161 of the GPU 160, or each of the microprocessing units of the processing unit 161.

Specifically for the exemplary operation shown in FIG. 3, a center pixel 54 is compared with adjacent eight pixels, and defined as 1 if the adjacent pixels are greater, but 0 if they are smaller. A binary pattern is calculated with the combinations (for example, counterclockwise) of a series of 1 and 0 defined. The binary pattern represents LBP features. Since the exemplary operation shown in FIG. 3 is an exemplary calculation for one pixel, it is needed to calculate LBP features for all pixels in the test image. Required are data of the center pixel as one target pixel and eight adjacent pixels, and therefore, the calculation may be carried out by each of the processing units 161 or the microprocessing units in parallel.

Each center pixel is allocated to each of the processing units 161, preferably, to each of the microprocessing units, to calculate a binary pattern, the LBP features for each center pixel depending on comparison by using eight pixels adjacent to each center pixel. Since each of the microprocessing units has to load at least nine pixels onto the L2 cache memory 163 or the memory (for example, L1 cache memory or register) in the microprocessing units, pixel data loading onto the memory takes much processing time.

Figure 4:
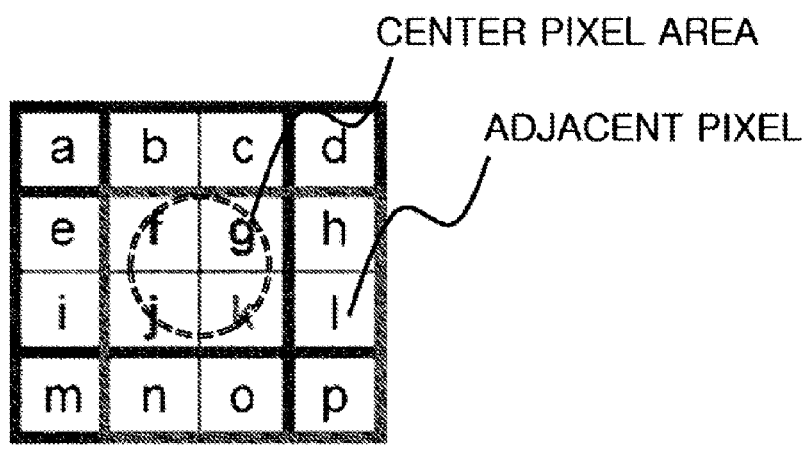
FIG. 4 is an exemplary alternative to FIG. 3 for image conversion to an LBP domain.

Meanwhile, FIG. 4 is an exemplary alternative to FIG. 3.

Unlike FIG. 3, FIG. 4 illustrates an example for calculating binary patterns for a plurality of center pixels by one processing unit 161 or one microprocessing unit.

Instead of calculating a binary pattern for one center pixel by the processing unit 161 (or microprocessing unit), the binary pattern may be calculated by using adjacent pixels for the respective center pixels adjacent each other within the center pixel area.

For example, the processing unit 161 may load the 2*2 center pixel area and the 12 adjacent pixels around the center pixel area onto the memory in the processing unit 161 or the L2 cache memory 163 and calculate four binary patterns with respect to the center pixel area by using the adjacent pixels. Accordingly, access to the memory may be reduced by up to 56% or more.

The center area size allocated to each processing unit 161 may be set in various ways, and the center area includes at least two adjacent center pixels. Consequently, the gray-scaled pixel data for the adjacent pixels and the pixels in the center pixel area are loaded onto a single memory accessible by a single processing unit 161. The single memory may be, for example, the L2 cache memory 163, a L1 cache memory or registers.

Through the aforementioned process, the facial identification apparatus 100 converts the test image to an LBP domain.

After step S105, the facial identification apparatus 100 detects a face through scanning across the test image converted to the LBP domain at a specific size at step S107.

FIG. 5 shows a process of changing a test image size, scanning and processing a test image by using a cascaded classifier (see P. Viola, M. Jones, "Rapid Object Detection using a Boosted Cascade of Simple Features", Computer Vision and Pattern Recognition (CVPR), 2001).

Figure 5A:
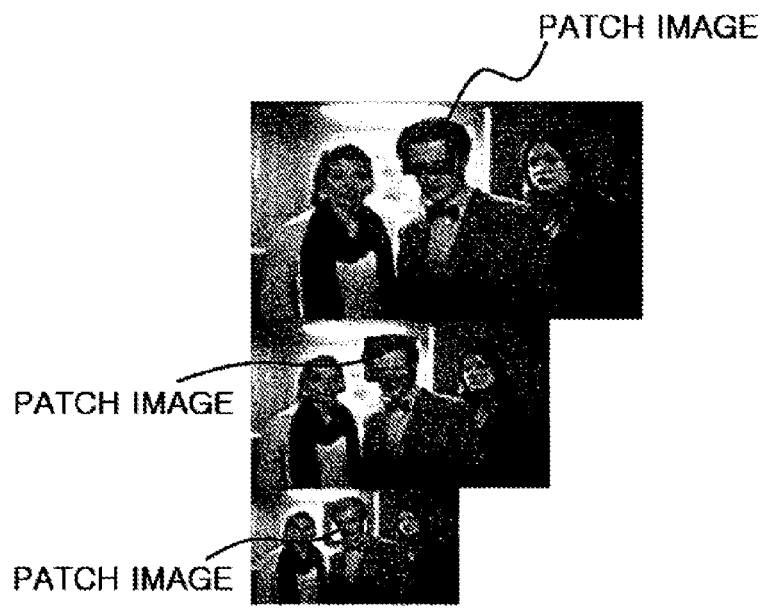
FIGS. 5A to 5C are a process of changing a test image size, scanning and processing a test image by using a cascaded classifier.
Figure 5B:
Figure 5C:
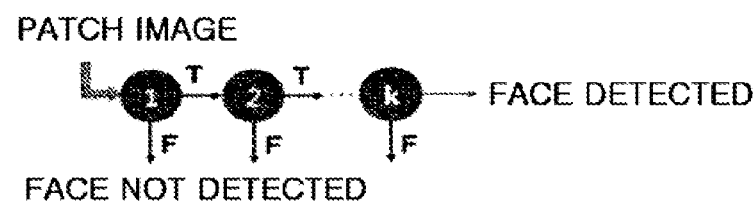

While the test image size of the facial identification method in accordance with the present invention is changed at step S103, the patch image for face detection in the changed test image is fixed (see FIG. 5A). In general, a well-known scanning process for face detection is carried out by scanning a patch image from left to right (along X axis) and from top to bottom (along Y axis) in sequence as shown in FIG. 5B. For each patch image scanned in sequence, a determination is made whether the concerned patch image is a face depending on the result outputted from a cascaded classifier. As described, although a typical scanning process is carried out in a sequential process, parallelization is required for parallel scanning in the plurality of processing units 161 in accordance with the present invention. In this regard, the patch image may also be referred to as a search window.

For parallelizing the process performed at step S107, the facial identification apparatus 100 determines a plurality of patch images to enable simultaneous face detection. For example, the facial identification apparatus 100 determines patch images in the X-axis direction and patch images in the Y-axis direction. The patch images are patch images subjected to sequential scanning in which they are executed in parallel. Some images of the patch images adjacent each other overlap each other.

The adjacent patch images in the X-axis direction are different each other just as much as the patch image of a scanning factor for X axis, for example, by the scanning factor for X axis (for example, two pixels). In addition, the patch images adjacent in the Y-axis direction are different each other just as much as the patch image of a scanning factor for Y axis, for example, by the scanning factor for Y axis (for example, two pixels). The adjacent patch images of the patch images determined as described above overlap on X axis or Y axis each other, and have different image areas just as much as a scanning factor, that is, the number of pixels of the scanning factor. The number of pixels in the overlapping areas is determined and specified by a scanning factor. Each patch image is classified by a cascaded classifier about whether the patch image is a face or not. The process of classifying each patch image is carried out by at least the processing units 151 and 161 (preferably, the processing units 161 of the GPU 160), to ensure parallelism and carry out the face detection process as rapidly as possible.

The number of determined patch images is determined by the test image size and the X- and Y-axis scanning factors. Therefore, the bigger the test image is and the smaller the scanning factor is, the greater the number of patch images is. Furthermore, although parallelism is ensured, processing takes much time. Therefore, there is a need for reducing processing time while avoiding lowered face detection performance.

Describing the cascaded classifier in relation to face detection, the cascaded classifier is configured to have a plurality of test stages (see FIG. 5C) each of which compares the sum of specific LBP features of patch images with a predetermined threshold and the patch images pass a concerned stage if the sum is more than the threshold. If it is below the threshold, a result value implying face classification failure is returned. In the next stage after passing the concerned stage, the sum of specific LBP features of the patch images is compared with a specified threshold to determine whether to pass the stage the same as the previous stage. In general, the locations of LBP features used in the previous stage are different from the locations of the LBP features used in the next stage.

Figure 6:
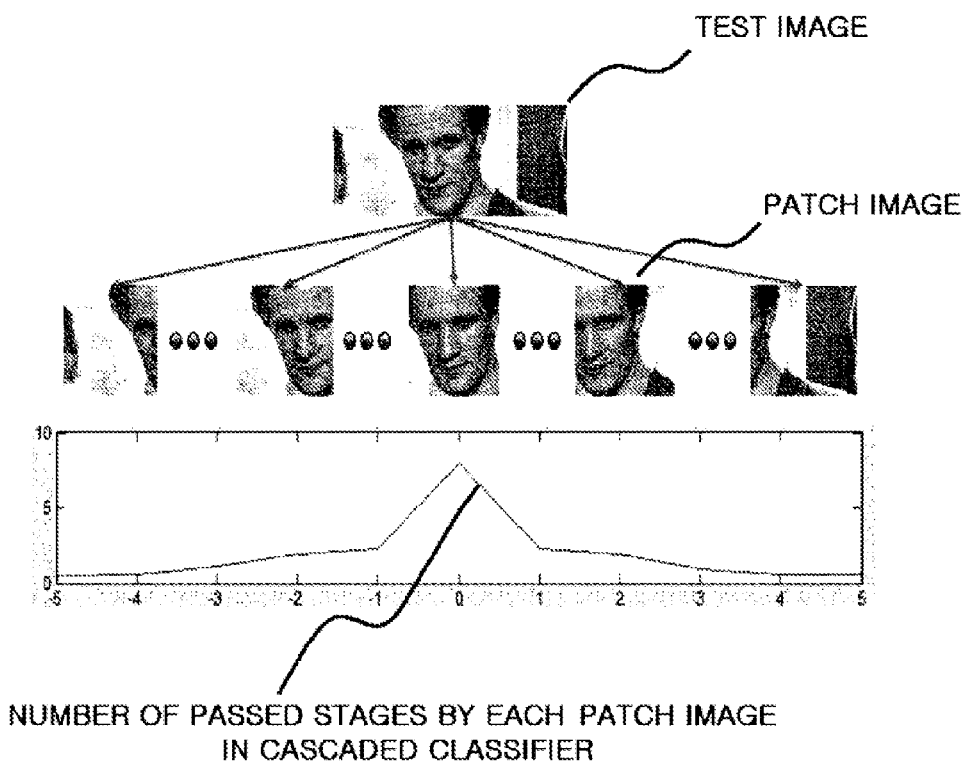
FIG. 6 illustrates the number of stages passed by each patch image when the patch images of a test image are applied to a cascaded classifier.

FIG. 6 illustrates the number of stages passed by each patch image when the patch images of a test image are applied to the cascaded classifier. As known from FIG. 6, it can be seen that adjacent patch images on X axis (or Y axis) are correlated in terms of the number of passed stages of the cascaded classifier. That is, FIG. 6 illustrates that, the smaller the number of stages by one patch image to pass is, the smaller the number of stages by adjacent patch images to pass is. Therefore, it is very likely that the patch image does not include a face. If the current patch image is more unlikely to be a face by using the aforementioned characteristics (that is, the number of passed stages over the cascaded classifier is smaller), the very next adjacent overlapping patch image is also more unlikely to be a face. In addition, since application of the characteristics requires the result from the previous patch image to be reflected, sequential execution is required, and it is thus hard to use parallelism of the processing unit 161 independently executed.

Figure 7:
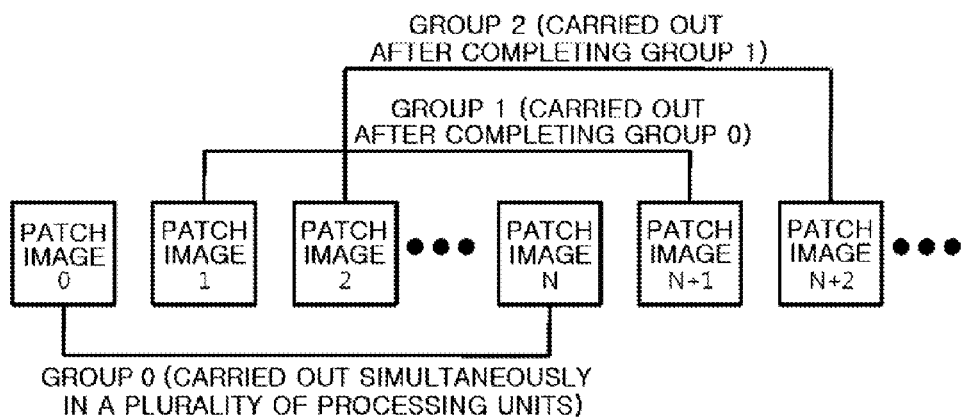
FIG. 7 illustrates an example for determining a plurality of patch images and carrying out face classification in consideration of both correlation of adjacent patch images and parallelism of processing units.

FIG. 7 illustrates an example for determining a plurality of patch images and carrying out face classification in consideration of both the aforementioned characteristics and parallelism of the processing units 161.

More specifically referring to FIG. 7, the facial identification apparatus 100 groups patch images depending on X-axis and Y-axis scanning factors as N (N is an integer equal to or greater than 2) groups during the process of determining a plurality of patch images. For example, patch images of each group overlap only on one axis (for example, Y axis). A partial image of patch images in the i (0<=i<N−2)-th group and the i+1-th group overlap each other by a scanning factor. Depending on N for grouping patch images and the scanning factor value, it is allowed to have a plurality of patch images with the same range of X values on a specific axis (Y axis), and patch images of each group are determined by using so called modular arithmetic.

The plurality of processing units 161 classifies each of the patch images in the 0-th (i=0) group to know whether it is a face by using a cascaded classifier implemented in the processing unit 161 in order to classify the patch images in each group to know whether they are a face. Subsequently, the result value from the cascaded classifier is stored in the internal memory 140 and/or the L2 cache memory 163. Since the 0-th group has already been made to have many (for example, 100 or more) patch images by the scanning factor, it is possible to fully use each of the plurality of processing units 161.

After that, the plurality of processing units 161 load each of the patch images in the first (i=1) group to classify the patch images to know whether the respective patch images are a face by using a cascaded classifier. The processing unit 161 for executing each patch image in this process may omit classification of face images through the cascaded classifier on the basis of the result value of adjacent and overlapping patch images in the 0-th (i−1) group. For example, if the adjacent patch image of the 0-th group fails face detection in the first stage, the processing unit 161 may determine that the patch image in the 1-th group is not a face without the stage test through the cascaded classifier.

The cascaded classifier is composed of a plurality of stages. It is configured to omit testing the next patch image through a first stage test, and test failure in higher stages may be used. In this case, although processing speed may be faster, it may increase false detection ratios. Therefore, it is contemplated that omitting testing through a first stage test contributes to improving processing speed and accuracy.

As described above, the plurality of processing units 161 may process each group in sequence and omit testing on the basis of the result value of a previous group in processing each group to improve processing speed of facial classification.

More specifically for classifying face images by a cascaded classifier, a plurality of stages of the cascaded classifier are constructed with weak classifiers (see FIG. 5C), and each stage classifier is configured to load and sum up LBP features of specific locations of a patch window to compare the sum with a predetermined threshold.

The specific locations of the LBP features in each stage are predetermined and scattered depending on discriminative power. The processing unit 161 or the L2 cache memory 163 of the GPU 160 is constructed to process or load data (SIMD) in a plurality of continuous locations. Therefore, when the specific locations are scattered, the processing power of the processing unit 161 or the L2 cache memory 163 is not fully used to lower performance.

In consideration of this issue, the cascaded classifier in accordance with the present invention is modified to position the LBP features in continuous locations of patch images. More LBP features than the number of typical specific locations scattered are used to have the same face detection performance with each stage of a typical cascaded classifier.

Figure 8:
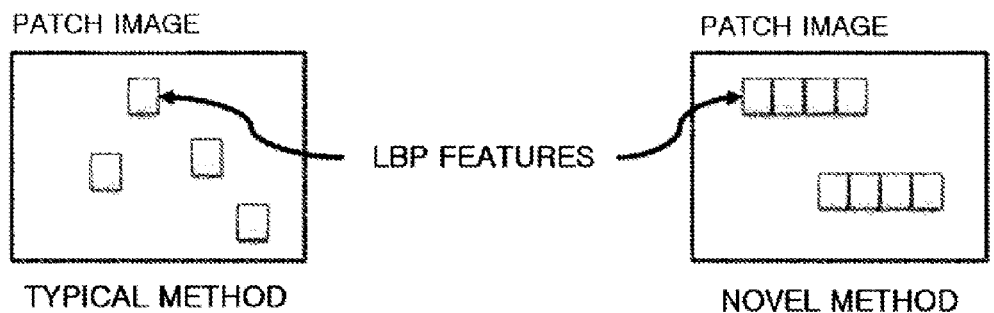
FIG. 8 illustrates exemplary locations of LBP features in a typical cascaded classifier and a novel cascaded classifier.

FIG. 8 illustrates exemplary locations of LBP features in a typical cascaded classifier and the cascaded classifier in accordance with the present invention. As shown in FIG. 8, face image classification by a cascaded classifier is carried out by loading binary patterns of continuous LBP features specified in specific locations of patch images of one group (i) in each stage from sequential memory addresses of the memory (for example, memory addresses of the internal memory 140, the storage medium 110, etc.), summing up binary patterns sequentially loaded to compare the sum with a threshold, and returning a result value implying face classification failure if the sum is smaller than the threshold. The returned result value is stored to be used in the next group (i+1). In particular, face image classification for a patch image of the next group may be omitted depending on the result value implying classification failure in the first stage. The patch images of the previous group (i) and the next group (i+1) are adjacent and overlap each other as much as specified pixels.

By utilizing correlation between groups through the aforementioned process, testing a specific patch image may be omitted, and rapid face detecting classification may be implemented without lowering performance by using memory access features of the processing unit 161.

After step S107 in FIG. 2, the facial identification apparatus 100 checks whether it is possible to change the image size at step S109. For example, the facial identification apparatus 100 may check whether it is possible to change the image size by knowing it is larger than the patch image when the image changed at step S103 is reduced in the scaling factor ratio again. In this example, the patch image is preferably in the form of a rectangle, and its size corresponds to a minimum size that allows a face to be identified at least on the patch image.

If, at step S109, it is possible to change the image, the process returns to S103 and the facial identification apparatus 100 repeats steps S103 to S107. Otherwise, the control flow goes to step S111.

A plurality of faces may be detected depending on repetition of steps S103 to S107 and scanning at step S107. The patch images of the plurality of faces may include the same pixel area, and show the same face, but have different scaling of the image. Therefore, patch images showing the same face are grouped as one group at step S111, and one of the patch images in the group is just used in a later face recognition process. The size of the patch image or the search window used in the face recognition process is fixed. Therefore, in the process of selecting one patch image, a patch image of the same size as the image size used in the process of face recognition is selected. If there is no patch image of the same size, any selected specific patch image (preferably, patch image of the highest resolution) is scaled to be the same size.

After step S111, the face detection process ends at step S200.

The control flow for the face detection shown in FIG. 2 may repeat, and, for example, repeat for each frame image of the video.

The flow diagram shown in FIG. 2 is arranged in a way that one or more of the conversion to LBP domain at step S105 and the scanning (detection trough scanning) at step S107 are carried out in the plurality of processing units 161 of the GPU 160. The result of profiling face detection demonstrates that the scanning accounts for approximately 47% of execution time or performance occupancy, and the conversion to LBP domain accounts for approximately 31% of execution time or performance occupancy. Therefore, reducing the execution time and improving performance focusing on the aforementioned functions has been contributed to improving performance as much as at least three times compared to a typical method.

Figure 9:
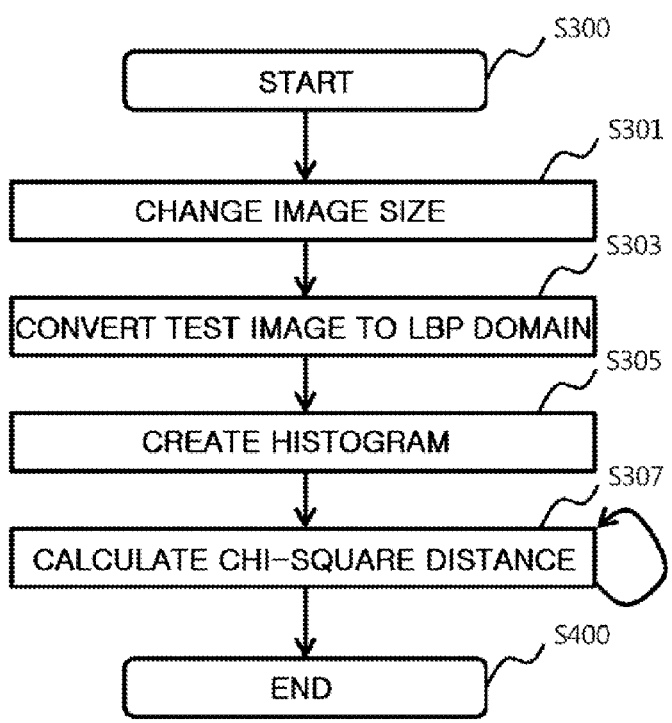
FIG. 9 is an exemplary flow diagram for face recognition carried out after face detection.

FIG. 9 is an exemplary flow diagram for face recognition carried out after face detection. The flow diagram shown in FIG. 9 illustrates a typical algorithm for face recognition, which illustrates an LBPH algorithm based on LBP features (see T. Ahonen, A. Hadid, M. Pietikainen, "Face Description With Local Binary Patterns: Application to Face Recognition", IEEE Transactions on Pattern Analysis and Machine Intelligence, vol. 28, no. 12, December 2006). The flow diagram shown in FIG. 9 is carried out in the facial identification apparatus 100 and by the facial identification program. Preferably, the flow diagram shown in FIG. 9 is constructed to load the facial identification program by the processor 150 to allocate specific functions of the facial identification program to the processing units 161 of the GPU 160 to be then carried out in parallel. Allocation of the respective functions to the processing unit 161 of the GPU 160 is carried out by the processor 150, and preferably by the facial identification program. In addition, specific steps illustrated in FIG. 9 may be omitted. For example, steps S301 and S303 may be omitted depending on the process of face detection (see FIG. 2). For better understanding, steps S301 and S303 are also described hereinbelow.

First, at step S301, the facial identification apparatus 100 changes the test image to be recognized into an image of a given size. Changing the image size is for changing the image into the same size as trained face images stored in the storage medium 110 of the facial identification apparatus 100. The facial identification apparatus 100 stores the trained images and preferably histograms of concerned images in the storage medium 110 utilizing a DB. Each trained image is the face image of a specific person for deciding sameness. It is possible to decide whether the test image represents a specific person through the recognition process.

Subsequently, at step S303, the test image is converted to an LBP domain the same as step S105 in FIG. 2. Accordingly, the test image is converted to binary patterns of a series of LBP features.

The facial identification apparatus 100 creates a histogram for the test image converted to LBP features at step S305. During the process of creating a histogram, the facial identification apparatus 100 divides the converted test image into grid areas, creates a histogram for each divided grid area, and combines the histograms of each grid area thereby creating a single histogram feature. The histogram is composed of, for example, 256 bins, and the total number of grid areas is, for example, 49 by dividing the image by 7 on X axis and 7 on Y axis.

Thereafter, at step S307, a Chi-square distance is calculated for each pre-stored trained image and the test image wherein each image has been created as a histogram for each grid area.

The control flow determines that a specific person of a trained image which has the smallest Chi-square distance and of which the Chi-square distance is not greater than a specified threshold after calculating the Chi-square distance is the identity of a face of the test image. After the determination, the control flow ends at step S400.

For face recogntion, it is known that calculation of a Chi-square distance accounts for approximately 99% of total execution time. Therefore, it is important to reduce the time required for calculating a Chi-square distance.

In calculating a Chi-square distance, the Chi-square distance is obtained by the following Equation 1:

$$x^2(x, \xi) = \underset{j,i}{Q} w_j \frac{(x_{i,j} - \xi_{i,j})^2}{x_{i,j} + \xi_{i,j}} \qquad \text{Equation 1}$$

where $\chi$ and $\xi$ represent a feature histogram to be compared, for example, $\chi$ represents a histogram of a test image and $\xi$ represents a histogram of a trained image. The index i represents one of the bins in the histogram, and j represents one specific grid area. For example, i ranges between 0 and 255, and j ranges between 0 and 48. $w_j$ represents a weight for a j-th grid area. While each grid area may have a different weight, a specific grid area with distinctive power for face recognition may have a weight greater than other grid areas. For example, the grid area for eyes or mouths may have a weight greater than other areas.

For the test image, a Chi-square distance to all trained images may be calculated, and the test image may be identified as the same face as a trained image with the shortest Chi-square distance, and of which the Chi-square distance is not greater than a predetermined threshold.

Parallelizing Chi-square distance calculation requires sum reduction in compliance with the Equation 1. This sum reduction includes a process of summing up all partial Chi-square distances between two bins of each histogram for each grid area in the test image and the trained image.

Parallelizing Chi-square distance calculation may phenomenally reduce the execution time required for face recognition, and is carried out by using the plurality of processing units 161 of the GPU 160, preferably by the plurality of microprocessing units of the processing unit 161. The Chi-square distances are calculated by the plurality of processing units 161 or the plurality of microprocessing units in cooperation with the processor 150.

According to the embodiment, for calculating Chi-square distances, three types of Chi-square distance calculation function and a mapping method to the processing unit 161 are suggested.

In a first method, the processor 150 allocates one trained image to the microprocessing units in the processing unit 161 by using the facial identification program and each microprocessing unit calculates a Chi-square distance for one trained image. This method is effective when there are many trained images for calculating a Chi-square distance since there are many trained images in the storage medium 110.

A second method is for allocating each histogram to microprocessing units.

Figure 10:
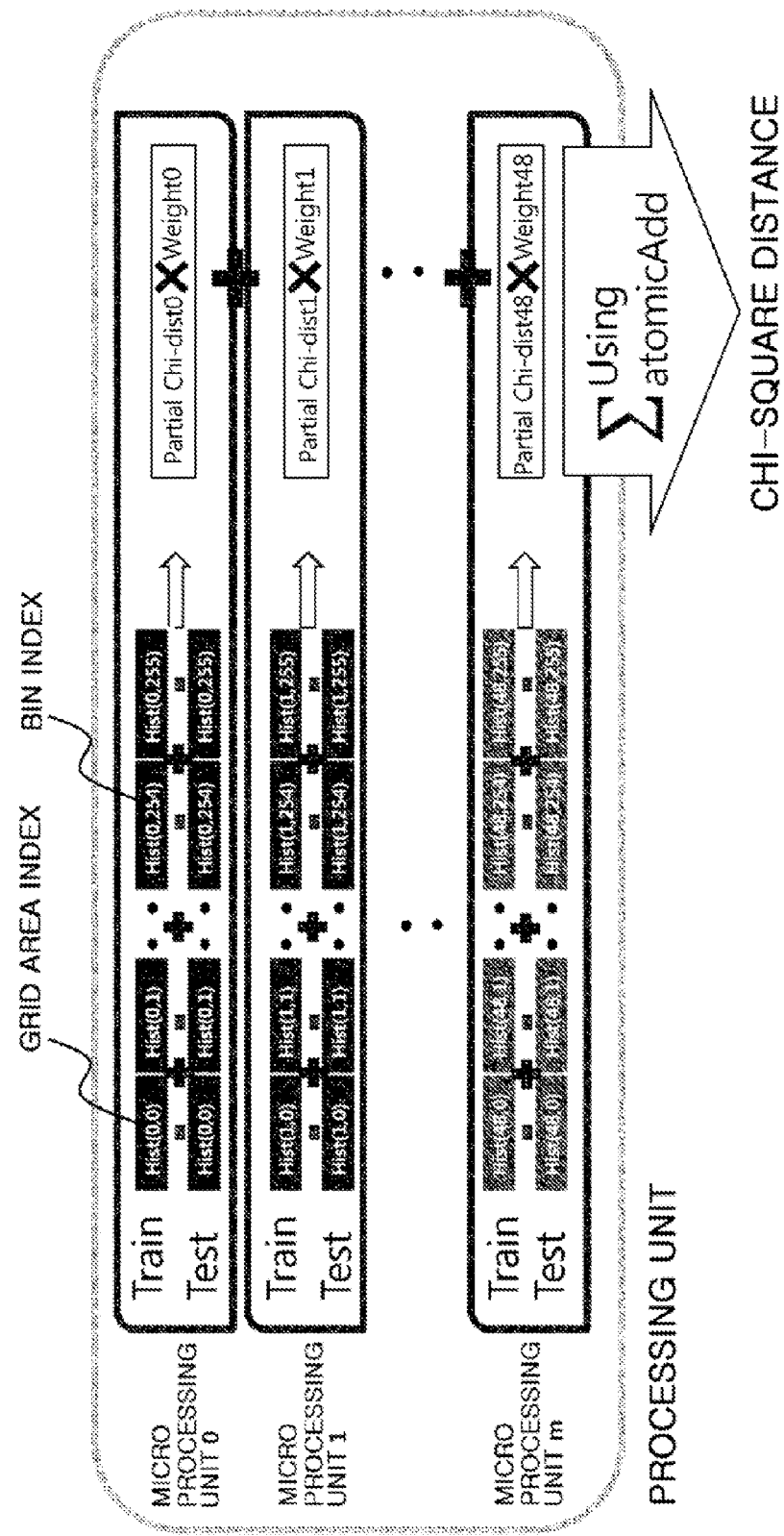
FIG. 10 is an exemplary functional allocation method for calculating a Chi-square distance.

FIG. 10 shows a schematic example of an allocation method for the processing unit 161 and the microprocessing units for the second method.

As known from FIG. 10, one processing unit 161 calculates a Chi-square distance between the test image and a trained image, and another processing unit 161 calculates a Chi-square distance between the test image and another trained image. Each microprocessing unit in the processing unit 161 calculates a partial Chi-square distance for each divided grid area (for example, 0~48) of the images. Accordingly, one microprocessing unit calculates a partial Chi-square distance for one specific grid area, and another microprocessing unit calculates a partial Chi-square distance for another specific one grid area. In addition, each partial Chi-square distance is multiplied by a weight $w_j$ of each grid area, and the partial Chi-square distances to which a weight is given are summed up by using the atomic add. Each addition operation may be carried out by a microprocessing unit processing each grid area independently or by one specific microprocessing unit after processing by all microprocessing units.

In compliance with the method of FIG. 10, the microprocessing unit repeats the process as many times as the number of bins, and the microprocessing units are allocated with one or more grid areas to cooperate each other for calculating a Chi-square distance.

In this case, m shown in FIG. 10 denotes an index of the microprocessing units. For example, if the processing unit 161 has 49 microprocessing units, each microprocessing unit calculates a partial Chi-square distance for one grid area. If the processing unit 161 has eight microprocessing units, each microprocessing unit calculates a partial Chi-square distance in sequence for seven or eight grid areas.

Figure 11:
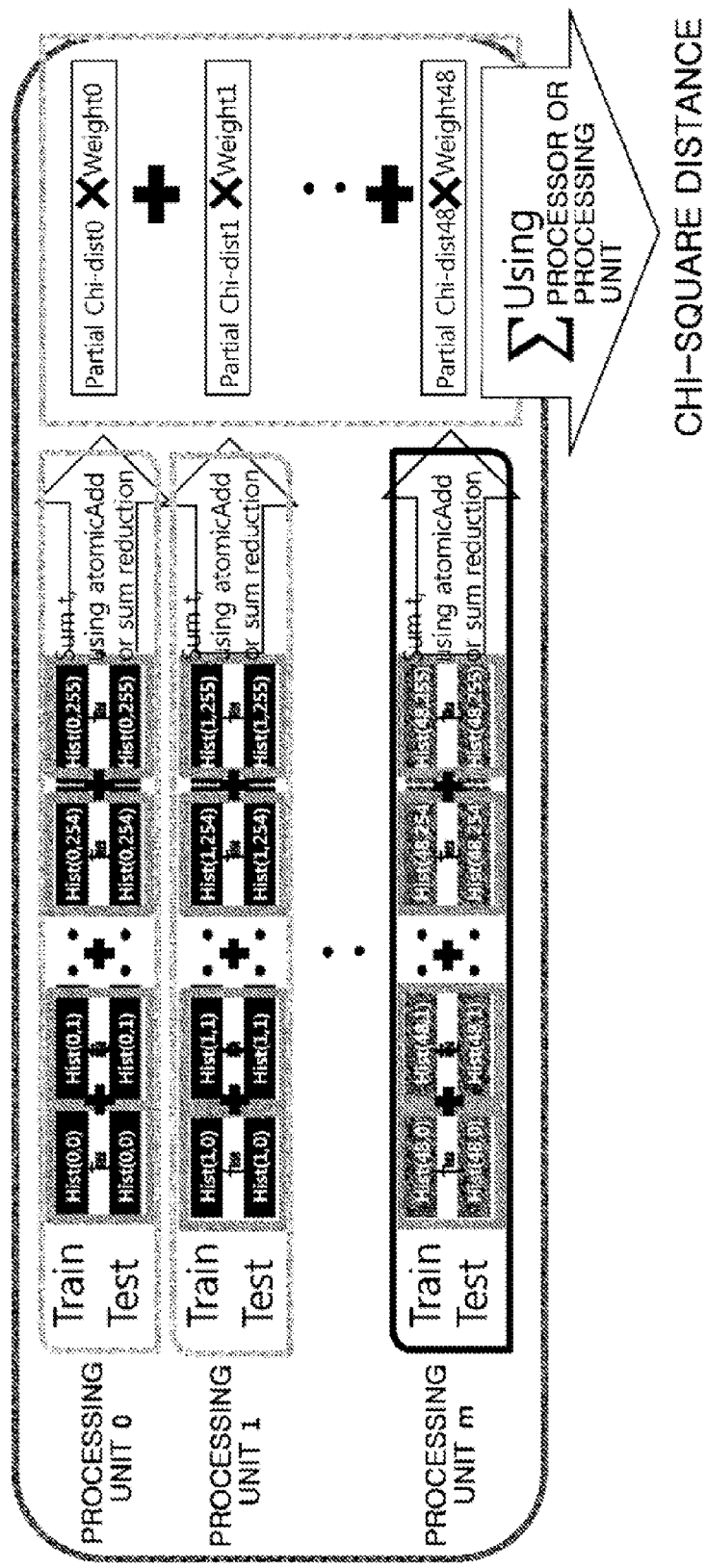
FIG. 11 is another exemplary functional allocation method for calculating a Chi-square distance.

A third method is for allocating each bin of a histogram to one microprocessing unit. FIG. 11 illustrates this method, one processing unit 161 calculates a partial Chi-square distance for one grid area, and another one processing unit 161 calculates a partial Chi-square distance for another grid area. The partial Chi-square distances calculated by the processing unit 161 are used to calculate a Chi-square distance between the test image and a trained image by the processor 150 or one processing unit 161.

In the third method, the microprocessing units in the processing unit 161 calculate a partial Chi-square distance for one bin of a histogram. For example, one microprocessing unit calculates a partial Chi-square distance for one a specific bin (for example, 0-th bin), and another microprocessing unit in the same processing unit 161 calculates a partial Chi-square distance for another specific bin (for example, 1-th bin). Each microprocessing unit calculates a partial Chi-square distance for each grid area through atomic add or sum reduction of the calculated partial Chi-square distance.

In this case, m shown in FIG. 11 denotes an index of the processing unit 161. For example, if the GPU 160 has 49 processing units 161, each processing unit 161 calculates a partial Chi-square distance for one grid area. If the GPU 160 has eight processing units 161, each processing unit 161 calculates a partial Chi-square distance in sequence for seven or eight grid areas.

The second and the third methods are constructed to maximize parallelism of the GPU 160, and this reduces execution time. For example, the second method may reduce execution time as much as at least twice in comparison with the first method, and the third method may reduce execution time as much as at least three times.

A face detection and face recognition method are described above with reference to FIGS. 2 and 9. The face detection and facial recognition method in accordance with the present invention is based on the LBP features, and constructed to maximize execution performance by using a hardware architecture of the processing unit 161 of the GPU 160. The method implemented face detection and face recognition of at least 22 frames per second for a frame image of HD resolution in the Mali GPU, and face detection and face recognition of at least 38 frames per second for a frame image of HD resolution in the Tegra K1 GPU. This enables video to be received in real time, and each frame of the received video to be processed in a frame time.

The face detection and face recognition method shown in FIG. 2 and/or FIG. 9 may be constructed with a computer program. This computer program is configured to be combined with the exemplary hardware blocks of the facial identification apparatus shown in FIG. 1 to carry out each step of FIG. 2 and/or FIG. 9. This computer program is stored in media. For example, the facial identification program may be stored in a storage medium, such as a hard disk, USB, DVD or CD portable or may be distributed through on-line.

While the present invention has been shown and described, the present invention is not limited to the aforementioned description and accompanying drawings. It will be understood by those skilled in the art that various substitutions, changes and modifications may be made without departing from the scope of the present invention as defined in the following claims.

What is claimed is:
1. A method for identifying a face, the method comprising:
   (a) changing an image size for facial identification;
   (b) converting the image of changed size to an LBP (Local Binary Pattern) domain;
   (c-1) determining a plurality of patch images for face detection from the converted image according to a first scanning factor in a first axis direction and second scanning factor in a second axis direction and grouping the determined plurality of patch images into N (N>=2) groups according to the first and second scanning factor corresponding to the first and second axis direction respectively, the grouped plurality of patch images being overlapping each other in the second axis direction based on the second scanning factor, wherein a patch image in an i (0<=i<N-2)-th group and a patch image in an i+1-th group are overlapping each other in the first axis direction by the first scanning factor, and the patch images of the i (0<=i<N-2)-the group and the i+1-th group in the first axis direction are different each other just as much as the patch image by the first scanning factor, (c-2) classifying each of the grouped plurality of patch images in the i-th group at a plurality of processing units by using a cascaded classifier having a plurality of test stages to determine whether each of the classified patch images includes a face image, wherein a result value from the cascaded classifier for each of the classified patch images of the i-th group is stored, and (c-3) after finishing the step of (c-2), omitting face image classification for a patch image in the i+1-th group by each of the plurality of processing units on the basis of the result value of i-th group patch image, wherein the i+1-th group patch image and i-th group patch are overlapping in the first axis direction.

2. The method of claim 1, further comprising:

(d) creating a histogram for the image area corresponding to a detected face area and converted to the LBP domain; and (e) calculating a Chi-square distance for the created histogram and each of a plurality of histograms, wherein said steps (d) and (e) are used for face recognition, and said step (e) is carried out by the plurality of processing units.

3. The method of claim 1, wherein said steps (a), (b), (c-1), (c-2) and (c-3) are repeated in compliance with a scaling factor, the scaling factor being factor for changing the image size.

4. The method of claim 1, wherein said step (b) comprises:

independently calculating by each of the plurality of processing units a binary pattern for each center pixels of center pixel area using pixels adjacent to each center pixel area for the each center pixel area allocated to each of the plurality of processing units, wherein the center pixel area comprises at least two or more adjacent pixels and pixel data of the adjacent pixels and pixel data of the center pixel area are loaded onto a single memory accessible by a single processing unit.

5. The method of claim 1, wherein said step (c-3) omit face classification for the i+1-th group patch image according to the result value of the i-th group patch image indicating face classification failure at first test stage within the plurality of test stages.

6. The method of claim 5, wherein said step (c-2) comprises:

loading specified binary patterns of the patch images from sequential memory addresses in a first test stage;

comparing sum of the binary patterns loaded at the sequential memory addresses with a threshold; and returning a result value implying face classification failure in the first test stage if the sum of the binary patterns is not greater than the threshold.

7. The method of claim 2, wherein each of the plurality of processing units comprises a plurality of microprocessing units; and said step (e) comprises:

in order for calculating the Chi-square distance, calculating a partial Chi-square distance for a first area of a histogram by a first unit of the plurality of microprocessing units;

calculating a partial Chi-square distance for a second area different from the first area by a second unit of the plurality of microprocessing units; and summing up the partial Chi-square distances by using atomic add.

8. The method of claim 2, wherein each of the plurality of processing units comprises a plurality of microprocessing units; and said step (e) comprises: to calculate the Chi-square distance, calculating a partial Chi-square distance for a first bin of a histogram by the first unit of the plurality of microprocessing units; calculating a partial Chi-square distance for a second bin of the histogram by the second unit of the plurality of microprocessing units; and summing up the partial Chi-square distances by the first unit and the second unit.

9. A facial identification apparatus, the apparatus comprising:

a processor configured to load a facial identification program to be executed; and a GPU (Graphics Processing Unit) connected to the processor and comprising a plurality of processing units, wherein the facial identification program is configured to: change an image size for facial identification; convert the image of changed size to an LBP domain; and detect a face through scanning across the converted image and wherein the processor or GPU determines a plurality of patch images for face detection from the converted image according to a first scanning factor in a first axis direction and second scanning factor in a second axis direction and grouping the determined plurality of patch images into N (N>=2) groups according to the first and second scanning factor corresponding to the first and second axis direction respectively, the grouped plurality of patch images being overlapping each other in the second axis direction based on the second scanning factor, wherein a patch image in an i (0<=i<N-2)-th group and a patch image in an i+1-th group are overlapping each other in the first axis direction by the first scanning factor, and the patch images of the i (0<=i<N-2)-the group and the i+1-th group in the first axis direction are different each other just as much as the patch image by the first scanning factor, and the plurality of processing units of the GPU classify patch images in the i-th group by using a cascaded classifier having a plurality of test stages to know whether the patch image includes a face image, stores a result value for patch images from the cascaded classifier and omitting face image classification for a patch image in the i+1-th group on the basis of stored result value of i-th group patch image, wherein the i+1-th group patch image and i-th group patch are overlapping in first axis direction.

10. The apparatus of claim 9, wherein for converting the image to the LBP domain, each of the plurality of processing units of the GPU independently calculates a binary pattern for each center pixels of center pixel area using pixels adjacent to each center pixel area allocated to each of the plurality of processing units, wherein the center pixel area comprises at least two or more adjacent pixels and pixel data of the adjacent pixels and pixel data of the center pixel area are loaded onto a single memory accessible by a single processing unit and included at the single processing unit.

11. The apparatus of claim 9, wherein the plurality of processing units is configured to:

load specified binary patterns of the patch images from sequential memory addresses of a memory in a first test stage of the cascaded classifier;

compare sum of the binary patterns loaded at the sequential memory addresses with a threshold; and omit classification of patch images adjacent and overlapping as much as specified pixels in an i+1-th group depending on a result value implying face classification failure in the first test stage if the sum of the binary patterns is not greater than the threshold.

12. The apparatus of claim 9, wherein a facial identification program is configured, for face recognition after face detection, to: create a histogram for an image area corresponding to a detected face area and converted to an LBP domain; and calculate a Chi-square distance for the created histogram and each of a plurality of stored histograms, and wherein the plurality of processing units is configured to calculate at least a Chi-square distance for the created histogram and each of the plurality of stored histograms.

13. The apparatus of claim 12, wherein each of the plurality of processing units comprises a plurality of microprocessing units; a first unit of the plurality of microprocessing units is configured to calculate, in order for calculating the Chi-square distance, a partial Chi-square distance for a first area of a histogram; a second unit of the plurality of microprocessing units is configured to calculate a partial Chi-square distance for a second area which is a different area; and the first unit and the second unit are configured to sum up the partial Chi-square distances by using atomic add.

14. The apparatus of claim 12, wherein each of the plurality of processing units comprises a plurality of microprocessing units; a first unit of the plurality of microprocessing units is configured to calculate, in order for calculating a Chi-square distance, a partial Chi-square distance for a first bin of a histogram; a second unit of the plurality of microprocessing units is configured to calculate a partial Chi-square distance for a second bin of the histogram; and the calculated partial Chi-square distances are summed up by the plurality of processing units.

15. A non-transitory computer-readable medium carrying one or more sequences of one or more instructions for a face recognition, the one or more sequences of one or more instructions including instructions which, when executed by one or more processors, cause the one or more processors to perform the steps of:

(a) changing an image size for facial identification;

(b) converting the image of changed size to an LBP (Local Binary Pattern) domain;

(c-1) determining a plurality of patch images for face detection from the converted image according to a first scanning factor in a first axis direction and second scanning factor in a second axis direction and grouping the determined plurality of patch images into N (N>=2) groups according to the first and second scanning factor corresponding to the first and second axis direction respectively, the grouped plurality of patch images being overlapping each other in the second axis direction based on the second scanning factor, wherein a patch image in an i (0<=i<N−2)-th group and a patch image in an i+1-th group are overlapping each other in the first axis direction by the first scanning factor, and the patch images of the i (0<=i<N−2)-the group and the i+1-th group in the first axis direction are different each other just as much as the patch image by the first scanning factor, (c-2) classifying each of the grouped plurality of patch images in the i-th group at a plurality of processing units by using a cascaded classifier having a plurality of test stages to determine whether each of the classified patch images includes a face image, wherein a result value from the cascaded classifier for each of the classified patch images of the i-th group is stored, and (c-3) after finishing the step of (c-2), omitting face image classification for a patch image in the i+1-th group by each of the plurality of processing units on the basis of the result value of i-th group patch image, wherein the i+1-th group patch image and i-th group patch are overlapping in the first axis direction.

* * * * *